United States Patent            (10) Patent No.:     US 9,231,330 B2
Tashiro et al.                      (45) Date of Patent:         Jan. 5, 2016

(54) ELECTRICAL CONNECTION BOX

(71) Applicant: Yazaki Corporation, Tokyo (JP)

(72) Inventors: Hiroki Tashiro, Makinohara (JP);
Hideki Kawamura, Makinohara (JP);
Yuki Komiya, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/603,441

(22) Filed: Jan. 23, 2015

(65) Prior Publication Data

US 2015/0132978 A1    May 14, 2015

Related U.S. Application Data

(63) Continuation of application No. PCT/JP2013/069989, filed on Jul. 24, 2013.

(30) Foreign Application Priority Data

Jul. 25, 2012 (JP) ................................. 2012-164338

(51) Int. Cl.
H01R 13/447    (2006.01)
H02G 3/08      (2006.01)
B60R 16/023    (2006.01)
H01R 13/502    (2006.01)

(52) U.S. Cl.
CPC .......... *H01R 13/447* (2013.01); *B60R 16/0238* (2013.01); *H01R 13/502* (2013.01); *H02G 3/086* (2013.01)

(58) Field of Classification Search
CPC ... H01R 13/447; B60R 16/0238; H02G 3/086
See application file for complete search history.

(56) References Cited

U.S. PATENT DOCUMENTS 6,761,567 B2 *  7/2004  Onizuka ............. B60R 16/0238
                                                    439/76.2
6,870,097 B2 *  3/2005  Oda ................... B60R 16/0238
                                                    174/50
6,922,332 B2 *  7/2005  Naimi ................ B60R 16/0238
                                                    361/641

(Continued)

FOREIGN PATENT DOCUMENTS

JP    2002-330527 A    11/2002
JP    2004-134278 A     4/2004
JP    2009-252453 A    10/2009

OTHER PUBLICATIONS

International Search Report for PCT/JP2013/069989 dated Aug. 27, 2013.

*Primary Examiner* — Ross Gushi
(74) *Attorney, Agent, or Firm* — Sughrue Mion, PLLC

(57) ABSTRACT

The electrical connection box includes a block and a frame which accommodates the block. The block is configured to include a terminal support section which supports a relief terminal section of a bus bar in a state in which the relief terminal section of a bus bar is protruded, and a first cover support section which is provided in the vicinity of the terminal support section. The frame is configured to include an insertion hole into which the relief terminal section is inserted when the block is accommodated, and a second cover support section which is provided in the vicinity of the insertion hole. A terminal cover is rotatably supported around a shaft section, with the shaft section being interposed between the first cover support section and the second cover support section in an accommodation state in which the block is accommodated in the frame.

8 Claims, 6 Drawing Sheets

(56) References Cited

U.S. PATENT DOCUMENTS

| | | | | |
|---|---|---|---|---|
| 7,053,298 B2* | 5/2006 | Ikeda | B60R 16/0238 | 174/50 |
| 7,168,962 B2* | 1/2007 | Yomura | H01R 9/226 | 439/76.2 |
| 7,321,286 B2* | 1/2008 | Nojima | H01H 85/205 | 337/186 |
| 7,357,649 B2* | 4/2008 | Asao | H05K 7/026 | 439/76.2 |
| 7,549,873 B2* | 6/2009 | Hayakawa | H05K 7/026 | 439/34 |
| 7,619,896 B2* | 11/2009 | Yamashita | H01R 9/226 | 165/80.3 |
| 7,632,110 B2* | 12/2009 | Kanou | H02G 3/086 | 361/704 |
| 7,642,456 B2* | 1/2010 | Baba | H01H 85/2045 | 174/17 R |
| 7,670,184 B2* | 3/2010 | Akahori | B60R 16/0238 | 439/620.27 |
| 7,671,608 B2* | 3/2010 | Oda | G01R 31/045 | 324/538 |
| 7,682,183 B2* | 3/2010 | Kanazawa | H01R 9/2408 | 439/357 |
| 7,699,623 B2* | 4/2010 | Yoshida | H02G 3/081 | 174/50 |
| 7,771,212 B2* | 8/2010 | Miyamoto | H05K 7/026 | 439/76.2 |
| 7,837,480 B2* | 11/2010 | Akahori | B60R 16/0238 | 439/76.2 |
| 7,893,364 B2* | 2/2011 | Oda | H05K 7/026 | 174/50 |
| 7,931,478 B2* | 4/2011 | Yamaguchi | H05K 7/026 | 361/752 |
| 8,035,040 B2* | 10/2011 | Nishikawa | B60R 16/0238 | 174/541 |
| 8,163,994 B2* | 4/2012 | Taniguchi | H02G 3/081 | 174/50 |
| 8,231,404 B2* | 7/2012 | Ikeda | B60R 16/0238 | 439/540.1 |
| 8,257,097 B2* | 9/2012 | Kawaguchi | H05K 7/026 | 439/76.2 |
| 8,378,235 B2* | 2/2013 | Matsui | H05K 7/026 | 174/541 |
| 8,383,963 B2* | 2/2013 | Ejima | B60R 16/0238 | 174/541 |
| 8,410,361 B2* | 4/2013 | Kita | B60R 16/0238 | 174/58 |
| 8,425,238 B2* | 4/2013 | Takeuchi | H02G 3/088 | 439/76.2 |
| 8,425,262 B1* | 4/2013 | Hirasawa | H01R 13/73 | 439/701 |
| 8,573,987 B1* | 11/2013 | Schweitzer | H01R 9/226 | 439/457 |
| 8,633,383 B2* | 1/2014 | Akahori | H01R 9/2458 | 174/50 |
| 8,723,033 B2* | 5/2014 | Hara | B60R 16/0238 | 174/17 R |
| 8,835,760 B2* | 9/2014 | Saimoto | H01R 13/42 | 174/50 |
| 8,878,059 B2* | 11/2014 | Makino | H02G 3/088 | 174/50 |
| 8,887,934 B2* | 11/2014 | Akahori | B60R 16/0238 | 220/3.7 |
| 8,907,213 B2* | 12/2014 | I | B60R 16/0238 | 174/50 |
| 8,912,443 B2* | 12/2014 | Akahori | H01R 9/226 | 174/59 |
| 8,927,858 B2* | 1/2015 | Sato | B60R 16/0238 | 174/50 |
| 8,927,860 B2* | 1/2015 | Yamamoto | H02G 3/22 | 174/50 |
| 8,941,009 B2* | 1/2015 | Makino | B60R 16/02 | 174/50 |
| 8,957,308 B2* | 2/2015 | Uchida | B60R 16/0238 | 174/50 |
| 8,969,723 B2* | 3/2015 | Hirasawa | H02G 3/088 | 174/50 |
| 9,017,082 B2 | 4/2015 | Makino | H02G 3/088 | 439/76.2 |
| 9,066,423 B2* | 6/2015 | Makino | H02G 3/088 | |
| RE45,621 E* | 7/2015 | Ejima | H02G 3/088 | |
| 9,099,850 B2* | 8/2015 | Kakimi | H02G 3/088 | |
| 9,102,284 B2* | 8/2015 | Hara | B60R 16/0238 | |
| 9,124,079 B2* | 9/2015 | Takeuchi | B60R 16/0238 | |
| 9,142,943 B2* | 9/2015 | Tashiro | H02G 3/08 | |
| 9,142,944 B2* | 9/2015 | Makino | H02G 3/088 | |
| 9,145,099 B2* | 9/2015 | Komiya | B60R 16/0238 | |
| 9,148,002 B2* | 9/2015 | Shibata | B60R 16/0238 | |
| 9,148,964 B2* | 9/2015 | Hattori | H05K 5/0004 | |
| 9,172,218 B2* | 10/2015 | Kamigaichi | H02B 1/01 | |
| 2005/0153583 A1* | 7/2005 | Kawamura | H01R 9/2458 | 439/76.2 |
| 2006/0205249 A1* | 9/2006 | Higuchi | H01H 85/044 | 439/76.2 |
| 2009/0253311 A1 | 10/2009 | Akahori et al. | | |
| 2012/0000686 A1* | 1/2012 | Soh | B60R 16/0238 | 174/50 |
| 2012/0064741 A1* | 3/2012 | Kawaguchi | H01R 9/226 | 439/76.2 |
| 2012/0119041 A1* | 5/2012 | Ikehata | H02G 3/16 | 248/201 |
| 2012/0132454 A1* | 5/2012 | Miyamoto | B60R 16/0238 | 174/50 |
| 2012/0327620 A1* | 12/2012 | Hara | H05K 7/026 | 361/759 |
| 2013/0194763 A1* | 8/2013 | Yoon | B60R 16/0238 | 361/752 |
| 2013/0343018 A1* | 12/2013 | Hattori | H05K 5/0026 | 361/755 |
| 2014/0020948 A1* | 1/2014 | Kamigaichi | H02G 3/08 | 174/535 |
| 2014/0022046 A1* | 1/2014 | Saimoto | H01H 85/2035 | 337/188 |
| 2014/0051270 A1* | 2/2014 | Miyazaki | B60R 16/0238 | 439/76.2 |
| 2014/0160697 A1* | 6/2014 | Stern | B60R 16/0238 | 361/752 |
| 2014/0168863 A1* | 6/2014 | Komiya | H02G 3/08 | 361/641 |
| 2014/0246217 A1* | 9/2014 | I | H05K 7/026 | 174/50.5 |
| 2014/0291013 A1* | 10/2014 | Higuchi | B60R 16/0238 | 174/535 |
| 2014/0311793 A1* | 10/2014 | Kaneko | B60R 16/0238 | 174/560 |
| 2014/0312031 A1* | 10/2014 | Kaneko | H02G 3/081 | 220/3.8 |
| 2014/0335724 A1* | 11/2014 | Kaneko | H05K 7/026 | 439/527 |
| 2015/0014016 A1* | 1/2015 | Kakoi | H05K 5/0247 | 174/59 |
| 2015/0047870 A1* | 2/2015 | Tanaka | B60R 16/0238 | 174/60 |
| 2015/0092384 A1* | 4/2015 | Miyazaki | B60R 16/0239 | 361/807 |
| 2015/0132978 A1* | 5/2015 | Tashiro | B60R 16/0238 | 439/142 |
| 2015/0288156 A1* | 10/2015 | Suzuki | B60R 16/0238 | 174/50 |

* cited by examiner

ELECTRICAL CONNECTION BOX

TECHNICAL FIELD

The present invention relates to an electrical connection box mounted on a vehicle, and more particularly, to an electrical connection box including a bus bar with a relief terminal section.

BACKGROUND ART

An electrical connection box mounted on a vehicle has various structures according to a vehicle type. However, for example, an electrical connection box has a structure including a block on which electrical components are mounted, a frame which accommodates the block, and a cover such as an upper cover, a lower cover, or a side cover which covers the block and the frame. The block or the frame is generally a molded article made of an insulating resin. In addition to bus bars connected to an external power supply, electrical components, such as various relays, fuses and fusible links, are mounted on the block. A cavity for accommodating the block is formed in the frame. Also, a relief terminal may be provided in the bus bar so as to supply power from an external power supply by using a booster cable at the time of battery exhaustion. A structure of an electrical connection box including the relief terminal is suggested (e.g., refer to Patent Literatures 1 and 2).

The relief terminal described in Patent Literature 1 is provided in a type of (similar) power supply box of the electrical connection box. As illustrated in FIG. 8, the electrical connection box includes a base 101, a main cover 102, and a bus bar 103 mounted on the base 101. The relief terminal 104 is provided in a bus bar 103. Furthermore, an opening 105 exposing the relief terminal 104 to the outside is formed in the main cover 102, and a sub cover 106 covering the opening 105 and the relief terminal 104 is attached. A hinge shaft 107 provided in the sub cover 106 and a bearing 108 made of an arc piece provided in the main cover 102 are mutually latched. Therefore, the sub cover 106 is rotatably supported to the main cover 102 over a position covering the relief terminal 104 and a position exposing the relief terminal 104.

On the other hand, a relief terminal described in Patent Literature 2 is provided in an electrical connection box including a block and a frame as described above. As illustrated in FIG. 9, a bus bar 112 is mounted on a block 111, and the relief terminal 113 is provided to protrude from a hole section 114 of the block 111. Also, a terminal support plate 115 protruding from an edge portion of the hole section 114 is integrally formed in the block 111, and the relief terminal 113 is provided along the terminal support plate 115. The relief terminal 113 and the terminal support plate 115 are grasped together by a clamp of a booster cable, and it is configured to prevent the disengagement of the clamp. Also, the block constitutes a box body accommodated in a frame (not illustrated). A cavity accommodating the block and an opening passing through the relief terminal 113 and the terminal support plate 115 are formed in the frame.

CITATION LIST

Patent Literature

Patent Literature 1: JP 2004-134278 A
Patent Literature 2: JP 2009-252453 A

SUMMARY OF INVENTION

Technical Problem

However, as in the electrical connection box of the related art, which is described in Patent Literature 1, the structure in which the bearing 108 made of the arc piece is formed in the main cover 102 and the hinge shaft 107 of the sub cover 106 is supported to the bearing 108 has a problem that the bearing 108 and the hinge shaft 107 considerably protrude from the box body, thereby increasing the size of the electrical connection box. Also, when the main cover 102 is manufactured by injection molding, the shape of the bearing 108 made of the arc piece is complicated. Therefore, in a manufacturing facility using a typical mold, a die cutting becomes difficult or the size of the manufacturing facility is increased due to the necessity of using a slide mold. For such reasons, it is disadvantageous in terms of manufacturing efficiency or manufacturing costs.

Therefore, it is an object of the present invention to provide an electrical connection box that can be made small while improving manufacturing efficiency and preventing an increase in manufacturing costs.

Solution to Problem

In order to achieve the above object, an electrical connection box described in a first aspect includes: a bus bar which includes a relief terminal section; a block which is made of an insulating resin and on which the bus bar is mounted; a frame which is made of an insulating resin and accommodates the block; and a terminal cover which covers the relief terminal section, wherein the block is configured to include a terminal support section which supports the relief terminal section in a state in which the relief terminal section is protruded, and a first cover support section which is provided in the vicinity of the terminal support section, the frame is configured to include an insertion hole into which the relief terminal section is inserted when the block is accommodated, and a second cover support section which is provided in the vicinity of the insertion hole, and the terminal cover is rotatably supported around a shaft section of the terminal cover, with the shaft section being interposed between the first cover support section and the second cover support section in an accommodation state in which the block is accommodated in the frame.

The electrical connection box described in a second aspect is characterized in that, in the electrical connection box described in the first aspect, the second cover support section is configured to include a semicircular arc section which extends from an edge portion of the insertion hole, is bent to have a semicircular arc shape, and is opened at a side of the first cover support section, and the shaft section is fitted into the semicircular arc section to allow the terminal cover to be held in the frame.

The electrical connection box described in a third aspect is characterized in that, in the electrical connection box described in the first or second aspect, the terminal support section is formed to have a cantilever plate shape capable of supporting the relief terminal section along one surface of the protruded relief terminal section, and the first cover support section, which is swollen in an in-plane direction of the relief terminal section, is formed in a base end portion of the terminal support section.

The electrical connection box described in a fourth aspect is characterized in that, in the electrical connection box described in any one of the first to third aspects, a cover protection section is disposed in the vicinity of the relief terminal section and is disposed at a front edge side of the relief terminal section rather than the terminal cover which is rotated to a position exposing the relief terminal section.

Advantageous Effects of Invention

According to the invention described in the first aspect, the first cover support section is formed in the block, and the second cover support section is formed in the frame. The terminal cover is rotatably supported around the shaft section, with the shaft section of the terminal cover being interposed between the first cover support section and the second cover support section. Therefore, the structure of each of the first cover support section and the second cover support section can be simplified. Also, the first cover support section and the second cover support section are configured to hold the shaft section from both sides of the accommodating direction of accommodating the block in the frame. By this configuration, the bearing section, which is configured by combining the first and second cover support sections, need not protrude to the outside of the electrical connection box. Therefore, the size of the electrical connection box can be reduced. That is, at the assembling of accommodating the block in the frame, the shaft section of the terminal cover is located at one of the first and second cover support sections and is interposed between one of the first and second cover support sections and the other thereof at the same time as the assembling. Therefore, since the terminal cover need not be mounted from the outside of the electrical connection box, the position of the bearing section can be set relatively freely. Furthermore, the first and second cover support sections are dividedly arranged in the block and the frame, respectively. Therefore, it is unnecessary to provide a circular arc piece having a complicated shape as in the bearing section of the related art. The die cutting is facilitated when the block and the frame are manufactured by injection molding. The structure of the mold can also be simplified. The simplification of the manufacturing facility or the reduction of the manufacturing costs can be achieved.

According to the invention described in the second aspect, since the second cover support section is formed to include the semicircular arc section opened at the side of the first cover support section, the semicircular arc section is opened along the accommodating direction of the block with respect to the frame. Therefore, when the frame is manufactured by injection molding, the frame including the semicircular arc section can be integrally formed without using a slide mold. Also, the shaft section is fitted into the semicircular arc section and the terminal cover is held in the frame. Thus, if the terminal cover is held at the time of the assembling of accommodating the block in the frame, an operator nee not press the terminal cover by hand or use other holder. Therefore, the assembling operation can be easily performed.

According to the invention described in the third aspect, the terminal support section is formed to have a cantilever plate shape along one surface of the relief terminal section, and the relief terminal section is supported to the terminal support section in the out-of-plane direction. Therefore, the deformation of the relief terminal can be prevented when the relief terminal section is grasped by the clamp of the booster cable. The grasping force of the clamp can be received by not only the terminal support section but also the relief terminal section, and the disengagement of the clamp can be prevented. Also, since the first cover support section is formed to be swollen from the base end portion of the terminal support section, the strength of the first cover support section can be increased as compared with the case where the first cover support section is formed as an independent protrusion or the like. The mold shape for forming the terminal support section and the first cover support section can be simplified.

According to the invention described in the fourth aspect, the cover protection section is provided in the frame, and the cover protection section is disposed at the front end side of the relief terminal section rather than the terminal cover which is rotated to the position exposing the relief terminal section. Therefore, when the relief terminal section is grasped by the clamp of the booster cable, the movement of the clamp toward the base end side of the relief terminal section can be restricted by the cover protection section, and the collision of the clamp and the damage to the terminal cover can be prevented.

BRIEF DESCRIPTION OF DRAWINGS

FIGS. 1A and 1B illustrate perspective views of a part of an electrical connection box according to an embodiment of the present invention, wherein FIG. 1A illustrates a frame and FIG. 1B illustrates a block.

FIGS. 2A and 2B illustrate enlarged perspective views of a main portion of the electrical connection box, wherein FIG. 2A illustrates a part of the frame and FIG. 2B illustrates a part of the block.

DESCRIPTION OF EMBODIMENTS

Hereinafter, an electrical connection box according to an embodiment of the present invention will be described with reference to FIGS. 1A to 7B. The electrical connection box according to the present embodiment is mounted on a vehicle to supply power to and transmit a signal to electronic devices mounted on the vehicle. Also, in the present invention, a junction block (also called "junction box"), a fuse block (also called "fuse box"), and a relay block (also called "relay box") are collectively referred to as an electrical connection box.

Figure 1A:
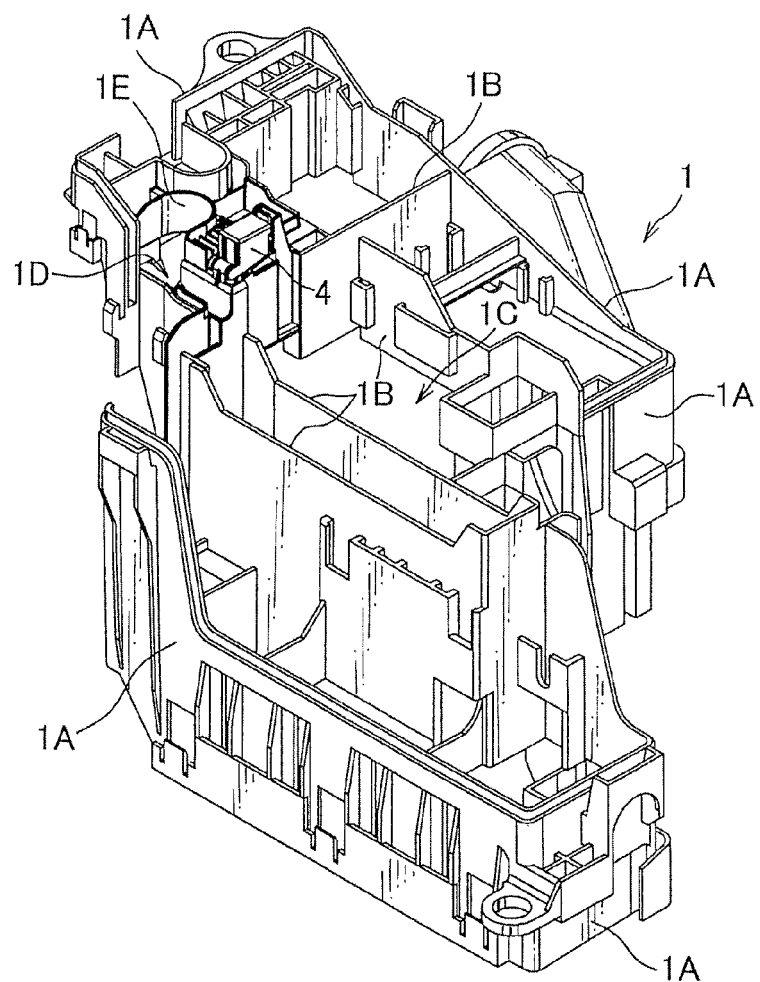
Figure 1B:
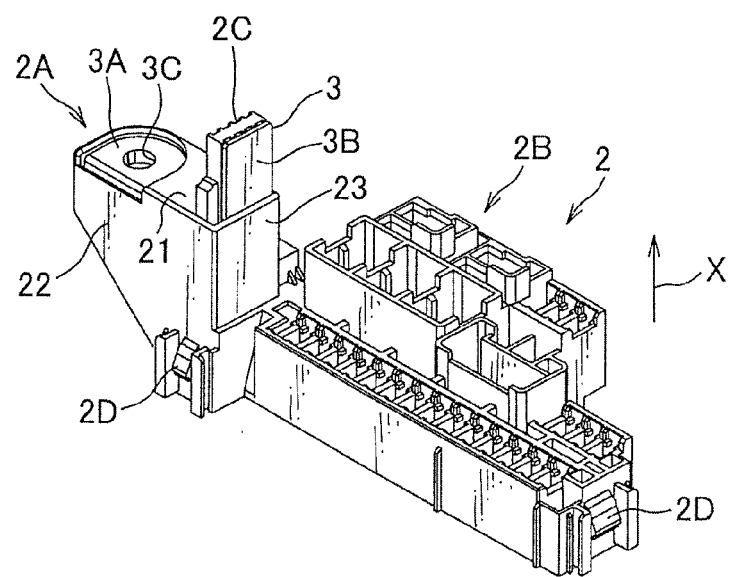
Figure 2A:
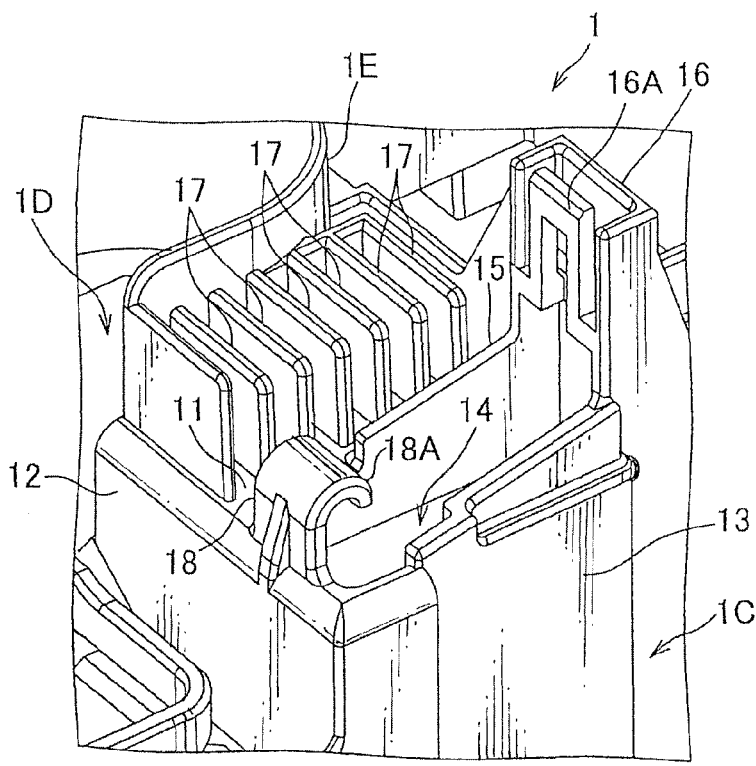
Figure 2B:
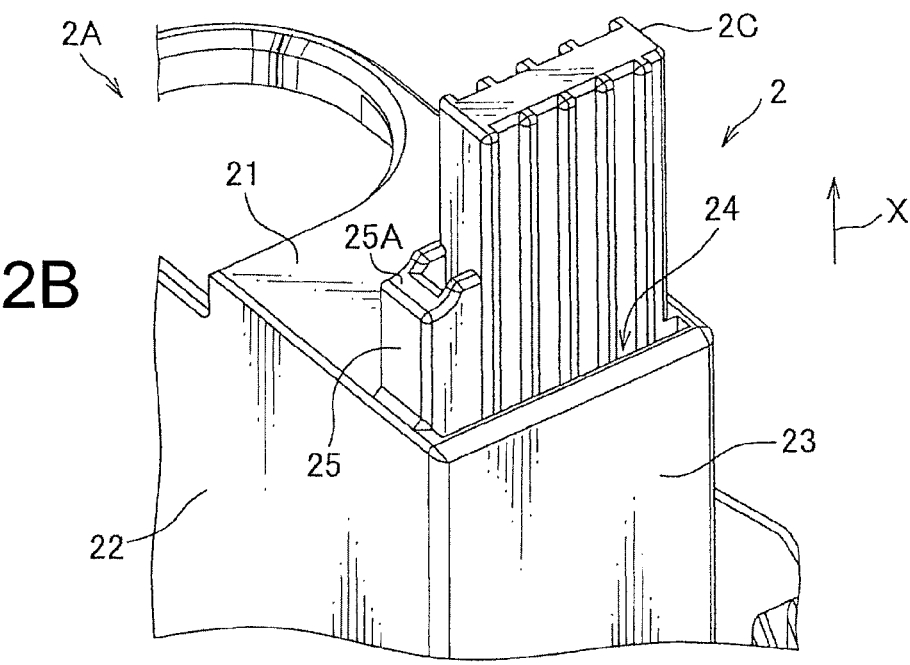

As illustrated in FIGS. 1A and 1B, an electrical connection box includes is configured to include a box body in which a frame 1 and a block 2 accommodated in the frame 1 are combined together. The electrical connection box is configured to further include a lower cover (not illustrated) covering a lower side of the box body, and an upper cover (not illustrated) covering an upper side of the box body. In FIG. 1B, among a plurality of blocks, a block (connection block) 2 is illustrated which includes an electrical connection section 2A to which a power line from an external battery or the like is connected. Also, the frame 1 illustrated in FIG. 1A and the block 2 illustrated in FIG. 1B are illustrated with different scales. The block 2 of FIG. 1B is illustrated to be larger in scale than the frame 1 of FIG. 1A.

The frame 1 is made of an insulating synthetic resin and is formed by a known injection molding. The frame 1 is configured to include a plurality of outer wall sections 1A surrounding an outer periphery of the frame 1, an inner wall section 1B partitioning the inside of the frame 1, and a plurality of cavities 1C and 1D partitioned by the inner wall section 1B to accommodate the block 2. Also, in the frame 1, an upright wall 1E is provided around the electrical connection section 2A of the block 2, and a terminal cover 4 is held to cover a relief terminal section 3B of a bus bar 3 to be described below.

The block 2 is made of an insulating synthetic resin and is formed by a known injection molding. The block 2 is configured to include the electrical connection section 2A and a component mounting section 2B on which a plurality of electrical components (a relay, a fuse, or the like) is mounted. Also, in the block 2, the bus bar 3 is provided over the electrical connection section 2A and the component mounting section 2B and is mounted to supply power to the plurality of electrical components. A bolt block (not illustrated) is attached to the electrical connection section 2A. The power line and the bus bar 3 are connected together through a bolt 5 of the bolt block (see FIGS. 3A, 3B, and the like). Furthermore, a terminal support section 2C is formed in the electrical connection section 2A. The terminal support section 2C protrudes upward from an upper surface section 21 of the electrical connection section 2A in a cantilever plate shape, is provided along the relief terminal section 3B of the bus bar 3, and supports the relief terminal section 3B.

The bus bar 3 is made of a conductive metal and is formed by a punching process or a bending process. The bus bar 3 is configured to include a main terminal section 3A located in the electrical connection section 2A of the block 2 and connected to the bolt 5, a relief terminal section 3B which connects another external power supply at the time of battery exhaustion, and a plurality of component terminal sections (not illustrated) which extends to the component mounting section 2B and to which the plurality of electrical components is connected, respectively. The main terminal section 3A is exposed to the electrical connection section 2A and includes a bolt insertion hole 3C into which the bolt 5 is inserted. The relief terminal section 3B protrudes upward from the block 2, and one side of the relief terminal section 3B is provided along the terminal support section 2C of the block 2.

The above-described block 2 is assembled with the frame 1 in a direction from a lower side toward an upper side (that is, an accommodating direction X) of FIGS. 1A and 1B a in a state in which the bus bar 3, the bolt block, or the electrical component is mounted. Therefore, the electrical connection section 2A is accommodated in the cavity 1C and the component mounting section 2B is accommodated in the cavity 1D. Also, by pressing the block 2 up to an accommodation position, a plurality of engagement sections 2D provided around circumferential walls of the block 2 are engaged with lock pieces (not illustrated) provided in the outer wall section 1A or the inner wall section 1B of the frame 1. In this way, the frame 1 and the block 2 are mutually fixed.

Next, a detailed configuration of the frame 1, the block 2, and the terminal cover 4 will be described with reference to FIGS. 2A to 5. In the frame 1, an upper surface section 11 and side surface sections 12 and 13 are provided at positions adjacent to the upright wall 1E. An upper side and a lateral side of the cavity 1D are surrounded by the upper surface section 11 and the side surface sections 12 and 13. An insertion hole 14, into which the relief terminal section 3B and the terminal support section 2C are inserted, is formed in the upper surface section 11. A rising wall 15 is formed at an edge portion of an upright wall 1E side in the insertion hole 14.

Each of upper edge portions of the side surface section 13 and the rising wall 15 is formed to be inclined in a height direction along a length direction of the insertion hole 14 (a horizontal direction of FIGS. 2A to 3B, an in-plane direction of the relief terminal section 3B). A rising section 16 is formed in a side having a high inclination (a right side of FIGS. 2A to 3B). The rising section 16 is formed to have a U-shaped cross-section continuous to the side surface section 13 and the rising wall 15. In the rising section 16, a locking piece 16A is provided to lock the terminal cover 4. A plurality of rib sections 17 (six rib sections 17 in the present embodiment) protruding upward is provided in the upper surface section 11 between the upright wall 1E and the rising wall 15.

Furthermore, in the frame 1, a second cover support section 18 is formed in a side opposite to the rising section 16 (a left side of FIGS. 2A to 3B), with the insertion hole 14 being interposed therebetween. The second cover support section 18 extends upward from an upper edge of the side surface section 12 that is an edge portion of the insertion hole 14. The terminal cover 4 is supported, with a shaft section 44 thereof being interposed between the second cover support section 18 and a first cover support section 25 to be described below. The second cover support section 18 is configured to include a semicircular arc section 18A which is bent from an upper end on a side of the rising section 16 and is opened downward (side of the first cover support section 25). The second cover support section 18, in which the semicircular arc section 18A is formed to have a semicircular arc shape, is integrally formed with the frame 1, including the semicircular arc section 18A. As a molding mold of the second cover support section 18, it is possible to use a molding mold which is opened in a vertical direction along the side surface sections 12 and 13 or the like. The frame 1 molded with respect to a mold (lower mold) of one side can be punched upward.

On the other words, in the electrical connection section 2A of the block 2, an upper surface section 21 and side surface sections 22 and 23 are formed at positions corresponding to the upper surface section 11 and the side surface sections 12 and 13 of the frame 1, respectively. In a state in which the electrical connection section 2A of the block 2 is accommodated in the cavity 1D of the frame 1, the upper surface section 21 and the side surface sections 22 and 23 are disposed along the inner surfaces of the upper surface section 11 and the side surface sections 12 and 13 of the frame 1, respectively. The terminal support section 2C of the block 2 is formed in a cantilever plate shape extending upward from the upper surface section 21. A slit-shaped hole section 24, into which the relief terminal section 3B is inserted, is formed in a base end portion of the terminal support section 2C. Furthermore, the first cover support section 25 is formed in the base end portion of the terminal support section 2C. The first cover support section 25 is swollen in a direction intersecting with a protruding direction (up direction) of the relief terminal section 3B inserted into the hole section 24 and in an in-plane direction of the relief terminal section 3B (horizontal direction of FIGS. 2A to 3B). The first cover support section 25 is integrally formed with the terminal support section 2C and extends in a vertical direction that is a protruding direction of the terminal support section 2C. A concave section 25A is formed in an upper end portion of the first cover support section 25. The concave section 25A faces the semicircular arc section 18A of the second cover support section 18 and constitutes a cylindrical bearing section together with an inner peripheral surface of the semicircular arc section 18A.

Figure 3A:
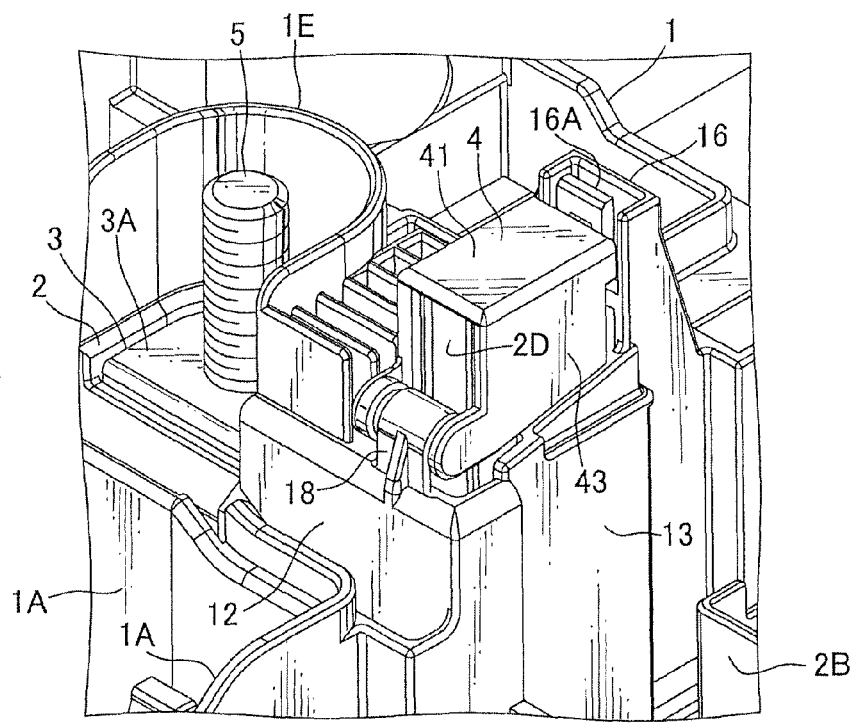
FIGS. 3A and 3B illustrate enlarged perspective views of a main portion of the electrical connection box so as to describe the operation of the electrical connection box.
Figure 3B:
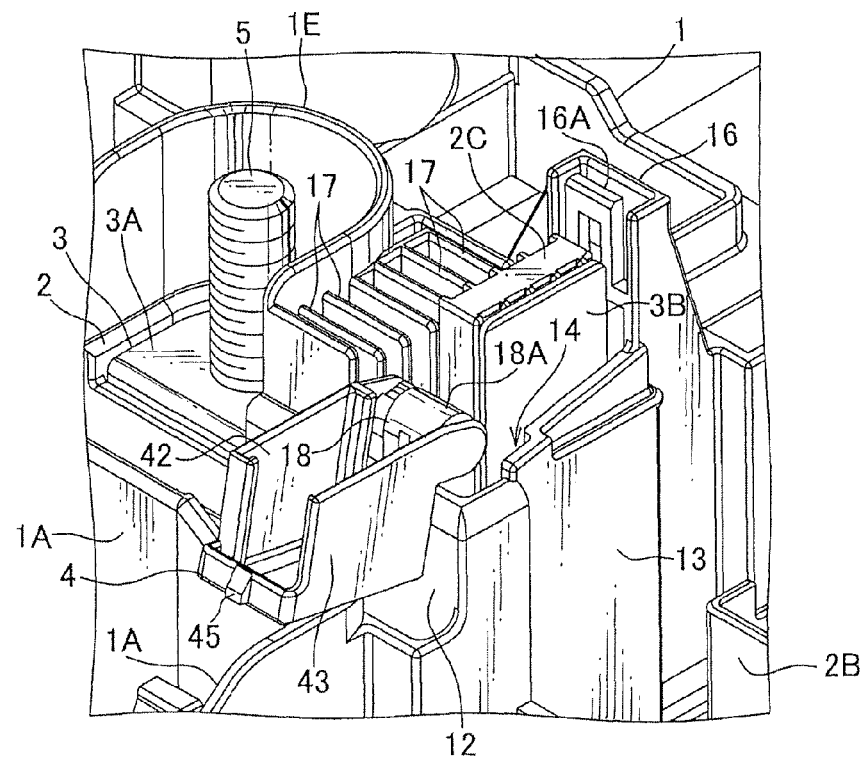
Figure 4:
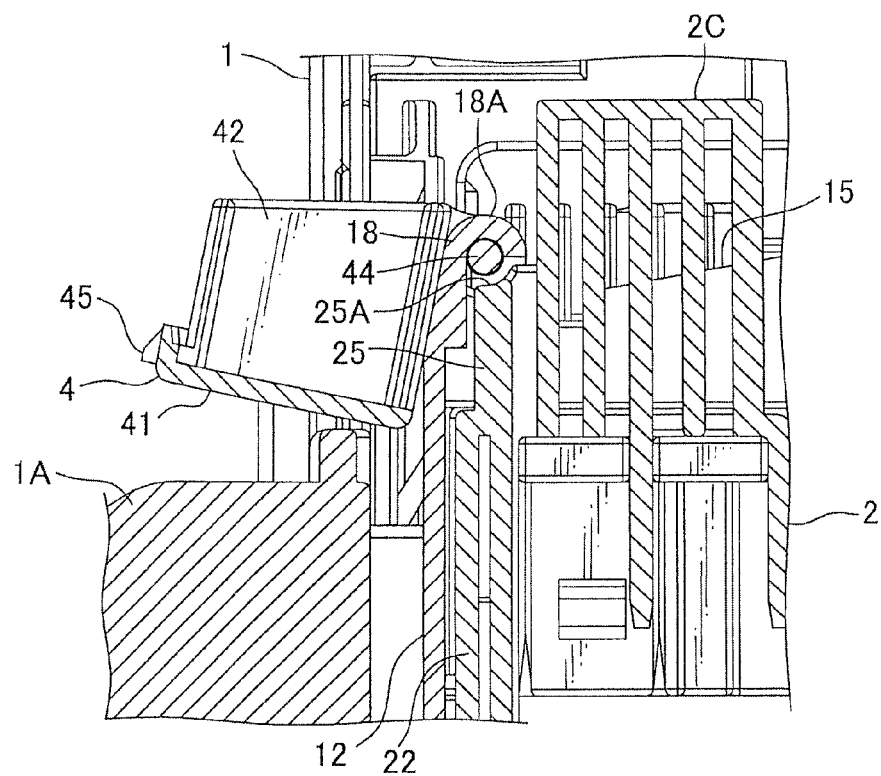
FIG. 4 illustrates an enlarged cross-sectional view of a main portion of the electrical connection box.
Figure 5:
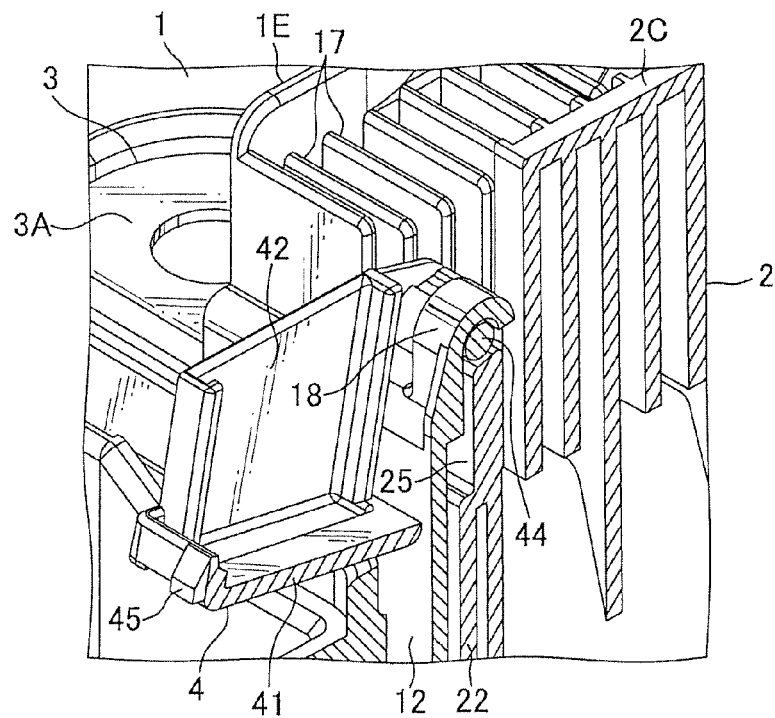
FIG. 5 illustrates an enlarged perspective view of a main portion of the electrical connection box.

As illustrated in FIG. 3A to 5, the terminal cover 4 is configured to include a top surface section 41 and left and right side surface sections 42 and 43 and thus has a substantially U-shaped cross-section as a whole. The side surface section 42 of one side (upright wall 1E side) is configured to cover the relief terminal section 3B along the terminal support section 2C, and the side surface section 43 of the other side is configured to cover the relief terminal section 3B along the relief terminal section 3B. Also, front edges of the side surface sections 42 and 43 (edges opposite to the top surface section 41) are formed to have an inclination corresponding to upper edges of the side surface section 13 and the rising wall 15 of the frame 1. Furthermore, a shaft section 44 is formed in the terminal cover 4. The shaft section 44 is extended by connecting one end portion of the front edge side of the side surface section 42 and one end portion of the front edge side of the side surface section 43. A locking protrusion 45, which is locked to the locking piece 16A of the frame 1, is formed in the vicinity of the top surface section 41 of the side opposite to the shaft section 44. The terminal cover 4 is rotatably supported, with the shaft section 44 being interposed between the concave section 25A of the first cover support section 25 and the semicircular arc section 18A of the second cover support section 18. The terminal cover 4 is configured to be openable or closable over a cover position covering the relief terminal section 3B as illustrated in FIG. 3A and a non-cover position exposing the relief terminal section 3B as illustrated in FIG. 3B.

Also, as illustrated in FIGS. 1A and 1B, the terminal cover 4 is in a temporarily attached state of being temporarily held in the frame 1 by fitting the shaft section 44 into the semicircular arc section 18A of the second cover support section 18 before the assembling of the frame 1 and the block 2. By assembling the block 2 with the frame 1 and facing the concave section 25A of the first cover support section 25 below the semicircular arc section 18A, the shaft section 44 is interposed between the semicircular arc section 18A and the concave section 25A. Therefore, the terminal cover 4 is in a mainly attached state of being non-detachably supported. In the mainly attached state, the locking protrusion 45 is locked to the locking piece 16A of the frame 1 by the rotation to the cover position. The front edge of the side surface section 42 abuts against the upper edge of the rising wall 15. The front edge of the side surface section 43 abuts against the upper edge of the side surface section 13. Therefore, the relief terminal section 3B and the relief terminal section 3B are covered.

Figure 6:
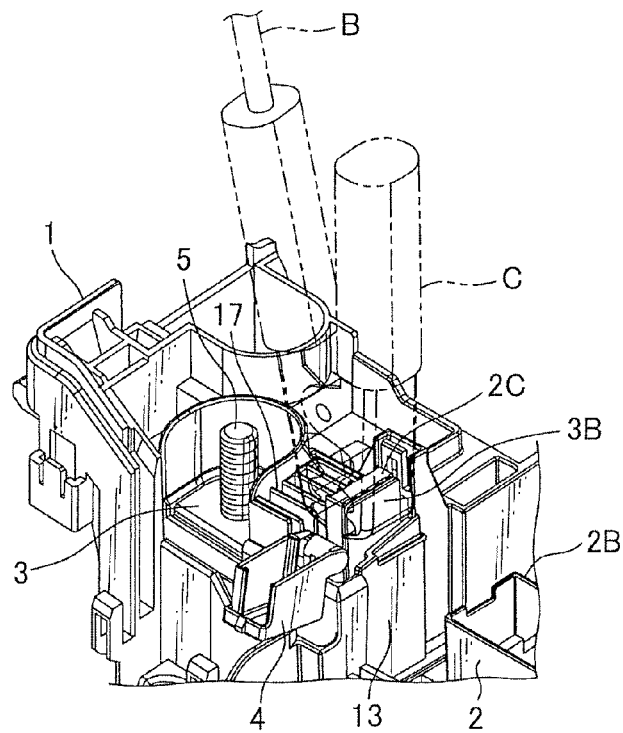
FIG. 6 illustrates a perspective view of a state when power is supplied to the electrical connection box.
Figure 7A:
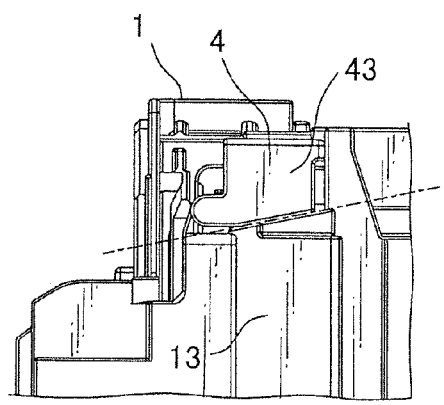
FIGS. 7A and 7B illustrate side views of the operation of a terminal cover in the electrical connection box.
Figure 7B:
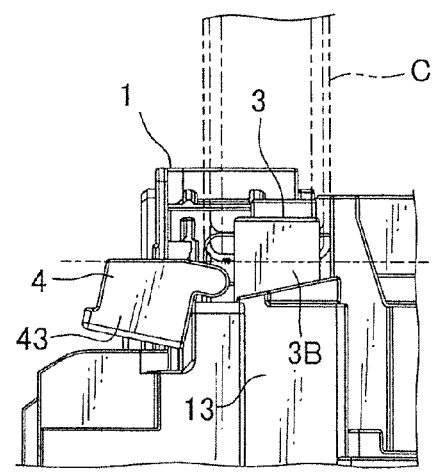
Figure 8:
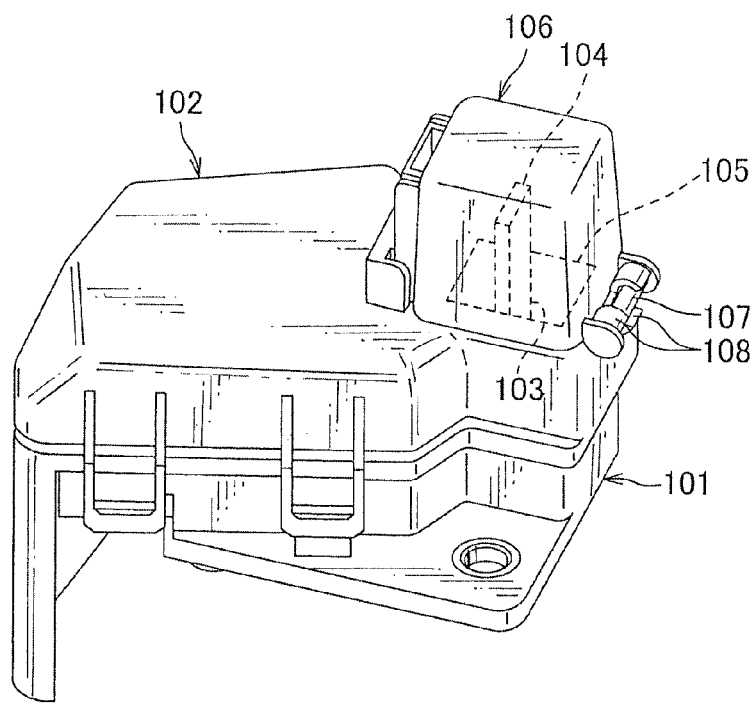
FIG. 8 illustrates a perspective view of an electrical connection box according to a related art.
Figure 9:
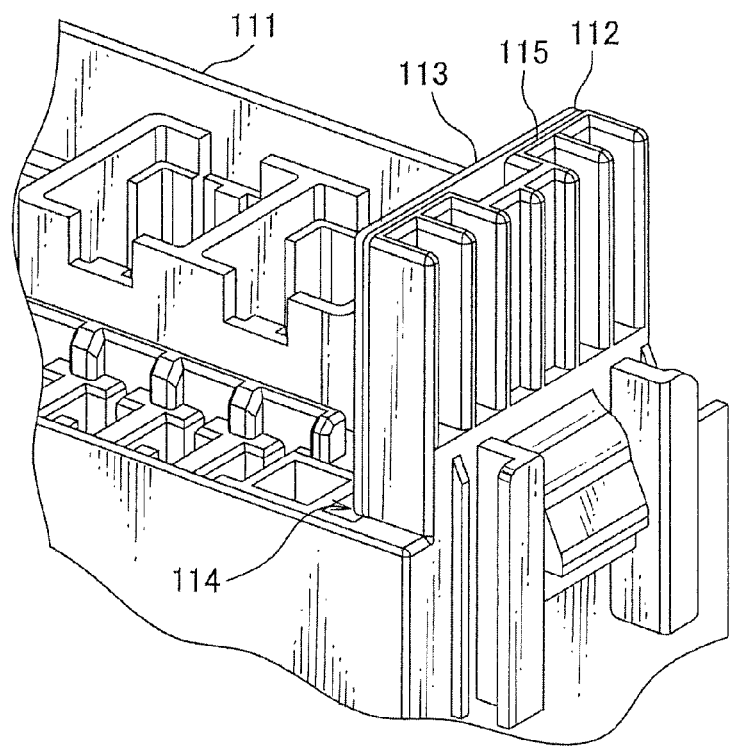
FIG. 9 illustrates a perspective view of a portion of an electrical connection box according to another related art.

In the above-described electrical connection box, in a case where power is supplied from another external power supply to the bus bar 3 at the time of battery exhaustion, as illustrated in FIG. 6, the relief terminal section 3B is exposed by rotating the terminal cover 4 to the non-cover position, and the relief terminal section 3B is grasped by the clamp C of the buster cable B. At this time, since the terminal support section 2C also is grasped together with the relief terminal section 3B by the clamp C, it is possible to prevent the disengagement of the clamp C. Furthermore, since the plurality of rib sections 17 is provided at the positions adjacent to the terminal support section 2C in the frame 1, the front end of the clamp C abuts against the rib section 17. Therefore, the downward movement is restricted, and the clamp C does not interfere with the terminal cover 4 opened at the non-cover position. Specifically, as illustrated in FIG. 7A, the inclination is formed at the front edges of the side surface sections 42 and 43 of the terminal cover 4. As illustrated in FIG. 7B, when the terminal cover 4 is opened, the front edges of the side surface sections 42 and 43 are substantially horizontal. The terminal cover 4 is located at a height below the front end of the rib section 17 indicated by a dashed line in the drawing. Therefore, the interference with the clamp C is prevented. That is, a cover protection section is configured by the plurality of rib sections 17. Since the interference with the clamp C is prevented, a damage to the terminal cover 4 can be prevented.

According to the present embodiment, the assembling is performed in such a manner that the second cover support section 18 is provided in the frame 1, the first cover support section 25 is provided in the block 2, and the block 2 is accommodated in the frame 1. Thus, the terminal cover 4 is rotatably supported, with the shaft section 44 being interposed between the semicircular arc section 18A of the second cover support section 18 and the concave section 25A of the first cover support section 25. Therefore, the first cover support section 25 and the second cover support section 18 may be provided at the position at which the shaft section 44 can be interposed between the semicircular arc section 18A and the concave section 25A in the accommodating direction (X direction illustrated in FIGS. 1A to 2B) of the block 2 with respect to the frame 1. It is unnecessary to provide the bearing section by protruding to the outside such as the side of the electrical connection box. Therefore, the size of the electrical connection box can be reduced. Also, since each of the cover support sections 18 and 25 may be formed to have the semicircular arc section 18A and the concave section 25A, instead of the complicated shape as in the bearing section of the related art, the frame 1 and the block 2 can be manufactured by injection molding using a mold with a relatively simple structure.

The above-described embodiments are merely the representative form of the present invention, and the present invention is not limited to the embodiments. That is, various modifications can be made without departing from the scope of the present invention.

For example, in the above-described embodiment, there is provided the example of the electrical connection box configured such that the electrical connection section 2A and the component mounting section 2B are provided in the block 2 and the plurality of electrical components is mounted on the component mounting section 2B. However, in the electrical connection box of the present invention, the electrical connection section 2A or the component mounting section 2B may not be provided in the block. Therefore, the main terminal section 3A or the plurality of component terminal sections may not be provided in the bus bar 3 mounted on the block. That is, the bus bar including the relief terminal section constituting the present may be formed separately from another bus bar including the main terminal section 3A or the component terminal section and may be appropriately connected to such another bus bar through a connection member.

Also, in the above-described embodiment, the relief terminal section 3B of the bus bar 3 is provided in the electrical connection section 2A of the block 2 which is adjacent to the main terminal section 3A, but the installation position or the protruding direction of the relief terminal section can be arbitrarily set. Also, the first and second cover support sections, which rotatably support the terminal cover, are not limited to the positions of the above-described embodiment, and may be provided at any one of other three sides in the edge portion of the insertion hole 14. That is, the support position or the rotating direction of the terminal cover may be arbitrarily set according to the installation location or the installation direction of the electrical connection box and may be appropriately set considering user convenience.

REFERENCE SIGNS LIST 1 frame
2 block 2C terminal support section
3 bus bar
3B relief terminal section
4 terminal cover
14 insertion hole
17 rib section (cover protection section)
18 second cover support section
18A semicircular arc section
25 first cover support section
44 shaft section

The invention claimed is:

1. An electrical connection box comprising:
a bus bar which includes a relief terminal section;
a block which is made of an insulating resin and on which the bus bar is mounted;
a frame which is made of an insulating resin and accommodates the block; and
a terminal cover which covers the relief terminal section, wherein
the block is configured to include a terminal support section which supports the relief terminal section in a state in which the relief terminal section is protruded, and a first cover support section which is provided in the vicinity of the terminal support section,
the frame is configured to include an insertion hole into which the relief terminal section is inserted when the block is accommodated, and a second cover support section which is provided in the vicinity of the insertion hole, and
the terminal cover is rotatably supported around a shaft section of the terminal cover, with the shaft section being interposed between the first cover support section and the second cover support section in an accommodation state in which the block is accommodated in the frame.

2. The electrical connection box according to claim 1, wherein
the second cover support section is configured to include a semicircular arc section which extends from an edge portion of the insertion hole, is bent to have a semicircular arc shape, and is opened at a side of the first cover support section, and
the shaft section is fitted into the semicircular arc section to allow the terminal cover to be held in the frame.

3. The electrical connection box according to claim 2, wherein
the terminal support section is formed to have a cantilever plate shape capable of supporting the relief terminal section along one surface of the protruded relief terminal section, and
the first cover support section, which is swollen in an in-plane direction of the relief terminal section, is formed in a base end portion of the terminal support section.

4. The electrical connection box according to claim 2, wherein a cover protection section is disposed in the vicinity of the relief terminal section and is disposed at a front end side of the relief terminal section rather than the terminal cover which is rotated to a position exposing the relief terminal section.

5. The electrical connection box according to claim 3, wherein a cover protection section is disposed in the vicinity of the relief terminal section and is disposed at a front end side of the relief terminal section rather than the terminal cover which is rotated to a position exposing the relief terminal section.

6. The electrical connection box according to claim 1, wherein
the terminal support section is formed to have a cantilever plate shape capable of supporting the relief terminal section along one surface of the protruded relief terminal section, and
the first cover support section, which is swollen in an in-plane direction of the relief terminal section, is formed in a base end portion of the terminal support section.

7. The electrical connection box according to claim 6, wherein a cover protection section is disposed in the vicinity of the relief terminal section and is disposed at a front end side of the relief terminal section rather than the terminal cover which is rotated to a position exposing the relief terminal section.

8. The electrical connection box according to claim 1, wherein a cover protection section is disposed in the vicinity of the relief terminal section and is disposed at a front end side of the relief terminal section rather than the terminal cover which is rotated to a position exposing the relief terminal section.

* * * * *